United States Patent
Ait-Mokhtar et al.

(10) Patent No.: US 12,282,847 B2
(45) Date of Patent: Apr. 22, 2025

(54) METHOD AND SYSTEM FOR EXTRACTION AND ANNOTATION USING SEMANTIC ATTRIBUTE PATHS

(71) Applicant: NAVER CORPORATION, Seongnam-si (KR)

(72) Inventors: Salah Ait-Mokhtar, Montbonnot-Saint-Martin (FR); Caroline Brun, Grenoble (FR); Agnes Sandor, Meylan (FR)

(73) Assignee: NAVER CORPORATION, Seongnam-si (KR)

( * ) Notice: Subject to any disclaimer, the term of this patent is extended or adjusted under 35 U.S.C. 154(b) by 980 days.

(21) Appl. No.: 17/234,011

(22) Filed: Apr. 19, 2021

(65) Prior Publication Data
US 2021/0390395 A1   Dec. 16, 2021

(30) Foreign Application Priority Data

Jun. 10, 2020   (EP) .................................... 20305634

(51) Int. Cl.
| | |
|---|---|
| *G06N 3/08* | (2023.01) |
| *G06F 16/2457* | (2019.01) |
| *G06F 16/28* | (2019.01) |
| *G06F 40/284* | (2020.01) |
| *G06F 40/30* | (2020.01) |
| *G06N 3/04* | (2023.01) |
| *G06F 3/04842* | (2022.01) |

(52) U.S. Cl.
CPC ......... *G06N 3/08* (2013.01); *G06F 16/24578* (2019.01); *G06F 16/285* (2019.01); *G06F 40/284* (2020.01); *G06F 40/30* (2020.01); *G06N 3/04* (2013.01); *G06F 3/04842* (2013.01)

(58) Field of Classification Search
CPC ...... G06N 3/08; G06N 3/04; G06F 16/24578; G06F 16/285; G06F 40/284; G06F 40/30; G06F 3/04842
See application file for complete search history.

(56) References Cited

U.S. PATENT DOCUMENTS

2021/0254994 A1   8/2021   Aït-Mokhtar et al.

OTHER PUBLICATIONS

Banko, M., et al., "Open Information Extraction from the Web," Communications of the ACM 51, No. 12, 2008, pp. 2670-2676.
Cerri, R., et al., "Hierarchical Multi-Label Classification Using Local Neural Networks," Journal of Computer and System Sciences 80, No. 1, 2014, pp. 39-56.

(Continued)

*Primary Examiner* — Pei Yong Weng
(74) *Attorney, Agent, or Firm* — Greer, Burns & Crain, Ltd (57) ABSTRACT

An annotation assistant for semi-automatic creation of annotated machine learning training data comprises a graphical annotation interface provider that provides a graphical annotation interface for displaying a sequence of tokens to be annotated and allowing a span selection by a user. An automatic span tagger comprises an artificial neural network configured to assign class probabilities to the tokens of the sequence of tokens and a processor-based path-scoring algorithm for computing scores for semantic attribute paths of the span selection. The graphical annotation interface is further configured for displaying the scored semantic attribute paths, and for receiving a selection among the scored semantic attribute paths from the user.

20 Claims, 8 Drawing Sheets

(56) References Cited

OTHER PUBLICATIONS

Cimiano, P. et al., "Towards the Self-Annotating Web," ACM, WWW, May 17-22, 2004, New York, New York, 2004, pp. 462-471.

Cunningham, H., et al., "Software Infrastructure for Natural Language Processing," Proceedings of the Fifth Conference on Applied Natural Language Processing, Washington, DC, 1997, pp. 237-244.

European Search Report received for Application No. 20305634.6 dated Oct. 30, 2020.

Graff, P., et al., "SkyNet: an efficient and robust neural network training tool for machine learning in astronomy," Monthly Notices of the Royal Astronomical Society, vol. 441, No. 2, 2014, pp. 1741-1759.

Huang, W., et al., "Hierarchical Multi-Label Text Classification: An Attention-based Recurrent Network Approach," Proceedings of the 28th ACM International Conference on Information and Knowledge Management, Nov. 3-7, 2019, Beijing, China, pp. 1051-1060.

Ji, G., et al., "Distant Supervision for Relation Extraction with Sentence-Level Attention and Entity Descriptions," Proceedings of the Thirty-First AAAI Conference on Artificial Intelligence, 2017, 7 pages.

Kalyanpur, A., et al., "SMORE—Semantic Markup, Ontology, and RDF Editor," Fort Belvoir, VA: Defense Technical Information Center, 2006, 6 pages.

Madjarov, G., et al., "An Extensive Experimental Comparison of Methods for Multi-Label Learning," Pattern Recognition 45, No. 9, 2012, 21 pages.

Prodigy: An annotation tool for AI, Machine Learning & NLP, "Radically efficient machine teaching. An annotation tool powered by active learning," Explosion Computer Software, available on the Internet at https://prodi.gy/, accessed on Jul. 8, 2021, 8 pages.

Stenetorp, P. et al., "Brat: A Web-Based Tool for NLP-Assisted Text Annotation," Proceedings of the 13th Conference of the European Chapter of the Association for Computational Linguistics, Avignon, France, Apr. 23-27, 2012, pp. 102-107.

Tayebikhorami, H. et al., "Oyster: A Tool for Fine-Grained Ontological Annotations in Free-Text," Information Retrieval Technology, 11th Asia Information Retrieval Societies Conference, AIRS 2015, Brisbane, QLD, Australia, Dec. 2-4, 2015. pp. 440-446.

Triguero, I., et al., "Labelling Strategies for Hierarchical Multi-Label Classification Techniques," Pattern Recognition 56, 2016, 38 pages.

Zeng, D., et al., "Distant Supervision for Relation Extraction via Piecewise Convolutional Neural Networks," Proceedings of the 2015 Conference on Empirical Methods in Natural Language Processing, Lisbon, Portugal, Sep. 17-21, 2015, pp. 1753-1762.

Zhang, L., et al., "Hierarchical Multi-Label Classification Using Fully Associative Ensemble Learning," Pattern Recognition 70, Oct. 2017, pp. 89-103.

METHOD AND SYSTEM FOR EXTRACTION AND ANNOTATION USING SEMANTIC ATTRIBUTE PATHS

PRIORITY CLAIM AND REFERENCE TO RELATED APPLICATION

This application claims priority to European Patent Office Application No. EP20305634.6, filed Jun. 10, 2020, and entitled A METHOD AND SYSTEM FOR FINE-GRAINED INFORMATION EXTRACTION AND ANNOTATION USING SEMANTIC ATTRIBUTE PATHS, which application is incorporated herein by reference in its entirety.

FIELD

The present disclosure relates generally to methods and systems for natural language processing using machine learning, and more particularly to processor-based methods and systems for generating annotated training data for use by an artificial neural network in fine-grained information extraction of input text.

BACKGROUND

Many recent advances in natural language processing (NLP) require large amounts of annotated, e.g., labeled, data that is currently only obtainable by manual entity and relation extraction from texts. Entity and relation extraction typically includes extracting entity mentions, identifying the entities' types, and indicating their semantic relation in sentences.

Known tools and methods for entity and relation extraction require a human annotator to select spans of two entities that are involved in a relation, assign entity labels to the selected spans, create a link between the two spans, and assign a relation label to the link. Because entity and relation extraction according to such known methods is a burdensome process, obtaining annotated machine learning data for relation extraction is expensive, hampering widespread use of rich relationship extraction systems.

A further limitation of state-of-the-art relation extraction methods and systems is that they cannot handle implicit relations. In an implicit relation, only one member of a span is explicitly mentioned in the text. For example, in the sentence "ask for Tara, she's the best", relating to a gym, the token "Tara" should be extracted as the name of an instructor for a sports class, even though the sentence does not mention any sports class.

SUMMARY

In example embodiments, methods of relation and entity extraction using semantic attribute paths are provided. A semantic attribute path corresponds to the path in an ontology such that the context-free entity type is the last node of the path. Example systems and methods can greatly reduce the effort and expense of annotation of textual examples for natural language processing, because only the selection of spans remains as a fully manual task.

According to example methods, in response to receiving a span selection for a text, for instance when a user such as an annotator selects a span within the text as the text is displayed on an interface, the text and the span selection are sent to an automatic span tagger of a class-based neural model and to a path-scoring algorithm that returns a set, e.g., an ordered list, of semantic attribute paths, optionally with respective scores. The span can be selected, for instance, by the annotator actuating a selection device, such as but not limited to a pointing device (e.g., a mouse, stylus, pointer), touch screen, tracking devices (finger, eye, head, hand, etc.), a microphone and speech-to-text processing, etc., that interacts with the interface. The example system can propose the semantic attribute path with the highest score to the annotator as the correct label, such as by providing the proposed semantic attribute path for display on the interface.

If the proposed semantic attribute path label is deemed incorrect by the annotator, the annotator can correct it by selecting (using any suitable selection device) an alternative semantic attribute path from the returned set, e.g., by selecting from a dropdown menu or other interactive element that contains obtained semantic attribute paths, which can be sorted according to their scores. In some example methods, at any time the annotator can select, e.g., using the interface, an option of retraining the class-based neural model using all annotated text examples, so that the example system improves successively at scoring the semantic attribute paths, further reducing the burden of the task because predictions of semantic attribute paths improve.

In embodiments, an annotation method for semi-automatic creation of annotated machine learning training data employing an artificial neural network is provided. The artificial neural network may be pre-trained according to pre-training methods provided herein. The annotation method may comprise receiving a sequence of tokens and a span selection, the span selection comprising one or more tokens from the sequence of tokens, and computing, by the artificial neural network, class probabilities for each token of the sequence of tokens, the class probabilities for a token corresponding to a probability for the token to fall under respective classes of a predefined ontology. The annotation method further comprises computing, using a processor, scores for semantic attribute paths of the span selection, the scores for the semantic attribute paths being based on the class probabilities, wherein the semantic attribute paths correspond to paths in the predefined ontology, and providing for display a set of semantic attribute paths for the span selection. The displayed set of semantic attribute paths may rank the semantic attribute paths by the respective score. The annotation method also comprises receiving a user selection of a semantic attribute path from the set of displayed semantic attribute paths, and storing the sequence of tokens and the selected semantic attribute path for the span selection in the annotated machine learning training data.

The annotation method may further comprise, in addition to any of the above features, re-training the artificial neural network employing the stored machine learning training data.

According to an embodiment, in addition to any of the above features, computing the scores for semantic attribute paths of the span selection is based on the class probabilities for the tokens of the span selection and on the class probabilities of tokens surrounding the tokens of the span selection.

According to another embodiment, in addition to any of the above features, receiving the user selection of a semantic attribute path comprises receiving a user input indicating acceptance of a semantic attribute path ranked highest in the set of semantic attribute paths or receiving a selection of an alternative semantic attribute path from the set of semantic attribute paths. Receiving the user input indicating acceptance of the semantic attribute path ranked highest may comprise receiving another span selection.

According to an embodiment, in addition to any of the above features, the semantic attribute path ranked highest in the list of semantic attribute paths may be set as a default user selection.

In embodiments, in addition to any of the above features, the sequence of tokens corresponds to a user-generated comment, such as a user-generated comment relating to a point of interest. In embodiments, the user-generated comment may relate to retailers.

According to an embodiment, a method of pre-training an artificial neural network for use in fine-grained information extraction is provided. The method comprises assigning seed tokens for each class of a predefined ontology, computing, using a processor, a similarity of all seed tokens assigned to the classes with vocabulary tokens in a vocabulary of pre-trained token vectors, and selecting a number of least similar vocabulary tokens as negative tokens. The method further comprises creating, using the processor, artificial texts by combining the seed tokens with tokens sampled from the list of negative tokens, and, using the processor, employing the classes of the seed tokens as annotations of the artificial texts for training an artificial neural network.

The method may further comprise in addition to any of the above features, optimizing the number of least similar vocabulary tokens. In embodiments, the predefined ontology contains a first number of top classes and a second number of semantic classes.

According to an embodiment, in addition to any of the above features, the pretrained artificial neural network may be used to compute class probabilities for tokens in a sequence of tokens in example methods provided herein.

According to another aspect, an annotation assistant for semi-automatic creation of annotated machine learning training data is disclosed. The annotation assistant may comprise a graphical annotation interface provider for causing for display a graphical annotation interface including a sequence of tokens to be annotated, wherein the graphical annotation interface is configured to allow a span selection by a user, and an automatic span tagger. The automatic span tagger may comprise an artificial neural network configured to assign class probabilities to each token of the sequence of tokens, wherein the class probabilities correspond to classes of a predefined ontology. The automatic span tagger may further comprise a processor-based path-scoring algorithm configured to compute scored semantic attribute paths for the span selection based on the class probabilities, the class probabilities for a token corresponding to a probability for the token to fall under respective classes of the predefined ontology. The graphical annotation interface provider may further be configured for causing the graphical annotation interface to further display the scored semantic attribute paths, and for receiving the selection among the scored semantic attribute paths from the user. The annotation assistant may further comprise storage for storing the sequence of tokens and a selected semantic attribute path for the span selection as annotated machine learning data.

In embodiments, in addition to any of the above features, the graphical annotation interface provider may further be configured for causing the graphical annotation interface to further display a train button to initiate re-training of the artificial neural network employing the stored machine learning training data.

According to another aspect, in addition to any of the above features, the path-scoring algorithm is configured to compute the scored semantic attribute paths for the span selection based on class probabilities by employing the class probabilities of the tokens in the span selection and the class probabilities of tokens surrounding the tokens of the span selection as optimal paths in the predefined ontology.

In embodiments, in addition to any of the above features, the artificial neural network is a multi-label classification artificial neural network trained for classifying spans of texts into the classes.

According to a complementary aspect, the present disclosure provides a computer program product, comprising code instructions to execute a method according to the previously described aspects; and a computer-readable medium, on which is stored a computer program product comprising code instructions for executing a method according to the previously described embodiments and aspects. The present disclosure further provides a processor configured using code instructions for executing a method according to any of the previously described embodiments and aspects.

Other features and advantages of the invention will be apparent from the following specification taken in conjunction with the following drawings.

DESCRIPTION OF THE DRAWINGS

The accompanying drawings are incorporated into the specification for the purpose of explaining the principles of the embodiments. The drawings are not to be construed as limiting the invention to only the illustrated and described embodiments or to how they can be made and used. Further features and advantages will become apparent from the following and, more particularly, from the description of the embodiments as illustrated in the accompanying drawings, wherein.

In the drawings, reference numbers may be reused to identify similar and/or identical elements.

DETAILED DESCRIPTION

In example embodiments, methods and systems are provided for information extraction, e.g., fine-grained information extraction, from a sequence of tokens such as input text. Example methods and systems can reduce the above-mentioned manual annotation burden and allow annotation employing implicit relations.

Example methods and systems employ sequence labelling of entities with full semantic attribute paths that indicate the contextual semantic role of the entities. Sequence labelling, which is a type of pattern recognition, involves assignment of respective categorical labels to tokens of a sequence of tokens. When the categorical labels belong to a fine-grained taxonomy, the problem becomes a multi-label classification task.

Multi-label classification has been treated in the state of the art for annotating complex but static taxonomies with hierarchical relationships such as "is-a", "has", "part-of". Such methods of hierarchical multi-label classification have been applied for classification of biological entities and text or image content classification (Gjorgji Madjarov et al: "*An extensive experimental comparison of methods for multi-label learning*", Pattern Recogn., 45(9): 3084-3104, 202; Wei Huang et al: "*Hierarchical multi-label text classification: An attention-based recurrent network approach*", in Proceedings of the 28th ACM International Conference on Information and Knowledge Management, CIKM '19, pages 1051-1060; Isaac Triguero and Celine Vens: "*Labelling strategies for hierarchical multi-label classification techniques*", Pattern Recognition, 56: 170-183, 2016).

However, known multi-label classification methods have not been applied for hierarchies with multiple inheritance between classes. In addition, such known methods do not apply multi-label classification methods to derive categorical labels from the textual context of tokens.

To support users in the task of entity and relation extraction from texts, several tools have been implemented, such as Brat (see Pontus Stenetorp et al: "*Brat: A web-based tool for NLP-assisted text annotation*", in Proceedings of the Demonstrations at the 13th Conference of the European Chapter of the Association for Computational Linguistics, EACL '12, pages 102-107), Oyster (see Hamed Tayebikhorami et al: "*Oyster: A tool for fine-grained ontological annotations in free-text*", in Proceedings of Information Retrieval Technology—11th Asia Information Retrieval Societies Conference, pages 440-446, 2015), and Prodigy (see the Internet at prodi.gy, titled "Prodigy, An annotation tool for AI, Machine Learning & NLP").

Brat relies on fully manual annotation by a user. However, Brat cannot handle implicit relation annotation and cannot deal with multiple heritage of semantic classes. In addition, annotation with a complex ontology involves a high number of labels in the annotation manual, making use of Brat very cumbersome. Oyster allows annotations to be defined with respect to named entities defined in a reference knowledge resource. It also features a mechanism to automatically suggest annotations to the users, using a prefix-based search algorithm that helps to speed up the mapping of entities from the reference knowledge resource. However, Oyster also fails to cover complex relations involving multi-inheritance.

Prodigy allows training of a machine learning model concurrently with the annotation process, thereby supporting the user in the annotation process by proposing annotations. Only when the machine learning model cannot determine the annotation with sufficient accuracy is the user requested to provide a selection from proposed annotations. However, Prodigy also does not allow annotation of implicit relations. Furthermore, the web interface of Prodigy does not support a large number of labels, and when default annotation patterns are created with seed tokens and/or rule-based patterns, the user interface requires the user to validate or invalidate or pass each annotation for which the mentioned token is a seed token, making the annotation process very burdensome.

Yet another approach to information extraction is unsupervised information extraction that involves extracting entities and relations between them without employing labeled data. Open information extraction (Michele Banko et al, "*Open information extraction from the web*", in Proceedings of the 20th International Joint Conference on Artificial Intelligence, pages 2670-2676, 2007) can identify relational patterns and instances automatically without predefined target relations. However, these methods typically yield sub-optimal results which are hard to interpret.

A further alternative approach for relation extraction is distant supervision that relies on knowledge bases such as Wikipedia. Distant supervision combines the benefits of semi-supervised and unsupervised relation extraction approaches. However, this approach is not applicable to contexts where corresponding knowledge bases do not exist. In addition, inherent noise introduced by mapping the knowledge-based relations to texts make distant supervision techniques less accurate than supervised techniques.

In example methods and systems provided herein, fine-grained information extraction is modelled as a sequence labelling problem, where labels are semantic attribute paths. The semantic attribute paths are assigned to entity mentions, i.e., spans of tokens, and thereby annotate the entities as values of semantic properties and attributes. The semantic attribute path of an entity describes the hierarchy of properties and attributes associated explicitly or implicitly to this entity in the context of the input text.

In example methods, each entity of a text is annotated with a full semantic path between entities, starting from a basic entity type of an ontology up to a highest-level entity type of the ontology. The ontology is a predefined graph of classes, typically comprising a set of top classes and a set of semantic classes. The ontology may be adapted specifically to the context of the texts to be analyzed. An example of an ontology will be explained below with reference to FIG. 6. An example semantic attribute path corresponds to a path from a top class to a lowest class in an ontology. Hence, the semantic attribute paths not only provide entity type labels for spans but also reflect roles of the spans in potential relations.

Figure 1A:
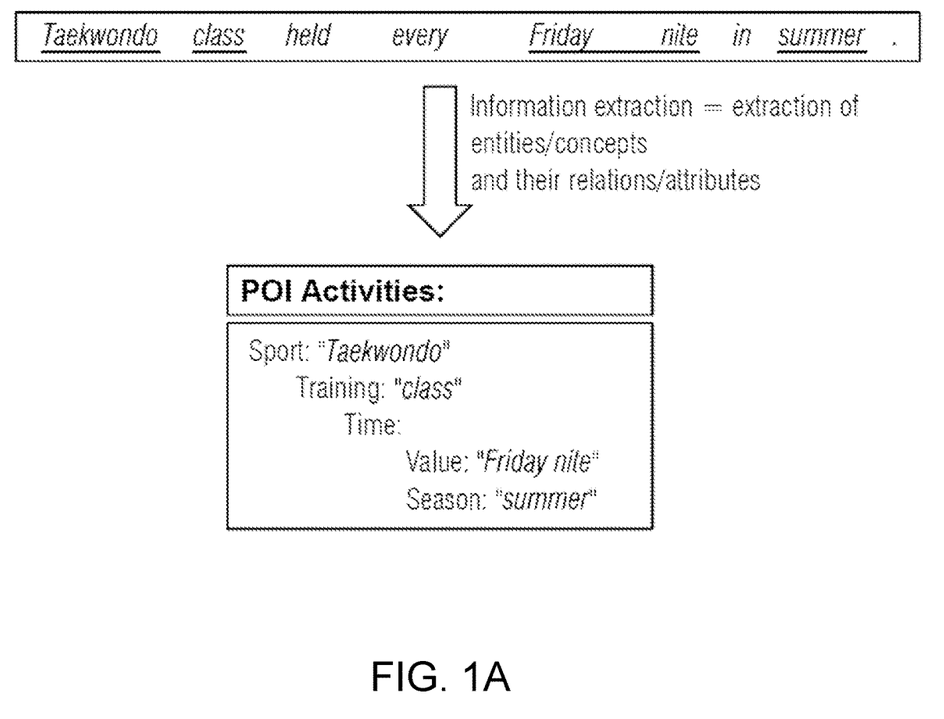
FIG. 1A illustrates entity and relation extraction in an example.

FIG. 1A shows relation and entity extraction for an example sentence. FIG. 1A shows the spans "Taekwondo", "class", "Friday nite" and "summer" as underlined. Relation and entity extraction corresponds to recognizing the token "Taekwondo" as an instance of a sport, the token "class" as falling under training, and "Friday nite" and "summer" as value and season, respectively, of a time entity.

Figure 1B:
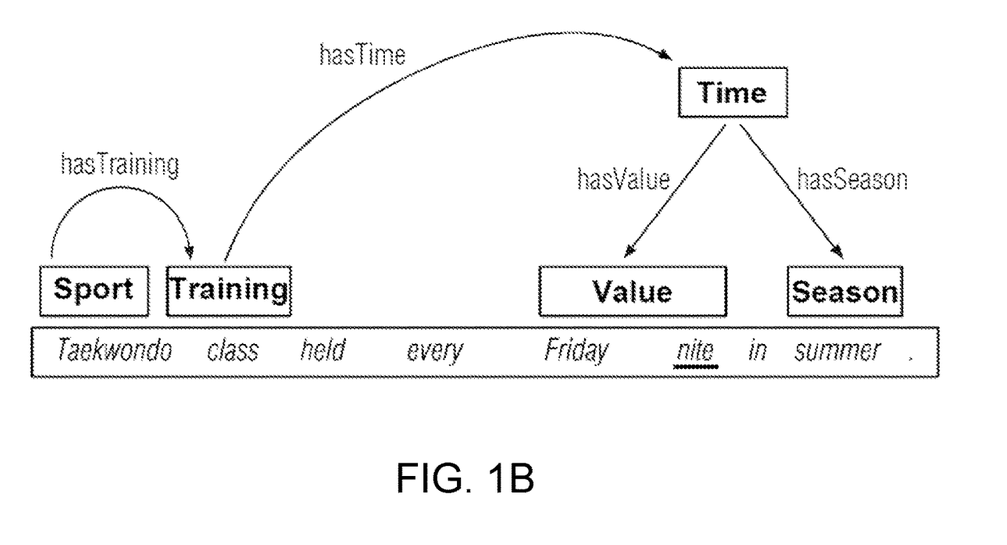
FIG. 1B illustrates a relation graph corresponding to the entity and relation extraction of FIG. 1A.

FIG. 1B illustrates, for the same example sentence, relations between the selected spans in the example. The class Sport for the span "Taekwondo" is in relation (relation labeled "hasTraining") with the semantic class Training, which is the entity type of the span "class". The semantic class Training is in relation with the semantic class Time (relation labeled "hasTime"), which is the entity type of the span "Friday nite in summer". The semantic class Time is in relation with two classes: Value (relation labeled "hasValue") and Season (relation labeled "hasSeason"), where Value is the entity type of the span "Friday nite" and Season is the entity type of the span "summer".

Figure 1C:
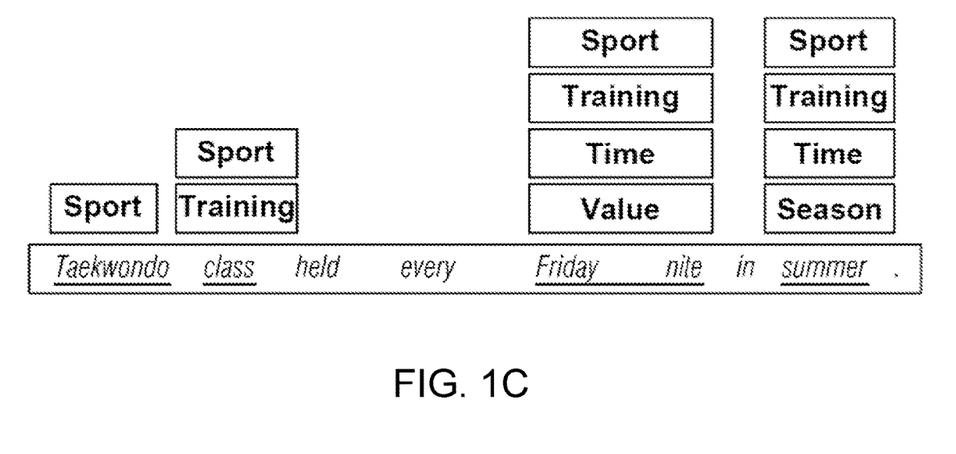
FIG. 1C illustrates a representation of the relation graph of FIG. 1B as semantic attribute paths for spans in the example sentence.

FIG. 1C illustrates the relaxation of the task of relation and entity extraction, as provided in example methods. In this approach, each span is labeled with a semantic attribute path, without explicitly annotating relations between the spans. However, relations between the spans are implicit in the hierarchy of the semantic attribute paths. Accordingly, for the same example sentence as in FIGS. 1A and 1B, "Taekwondo" is labeled as having the semantic attribute path of Sport, the span "class", having the semantic type Training, is labeled as Sport.Training, and the span "Friday nite" as Sport. Training. Time. Value.

Analogously, the span "summer" is labeled as Sport.Training.Time.Season, because Season is the entity type of the span "summer". The semantic attribute path of the token "summer" therefore means that summer is a time entity with the attribute Season, which is a Training time for a Sport. In reverse direction, the path can be understood as meaning that there is a Sport which has an attribute of type Training, which has an attribute of type Time, which has an attribute of type Season whose value is the span "summer". No explicit relation between the entities is included in this model, so that the span "class" is not explicitly attached to the span "Taekwondo", which implies that this model allows for the representation of implicit relations.

With example approaches of employing semantic attribute paths, annotation effort is significantly reduced because only spans and not relations are annotated. Furthermore, assigning labels to selected spans can be performed semi-automatically. For example, only the span of selection may remain a task requiring fully manual intervention.

Figure 2:
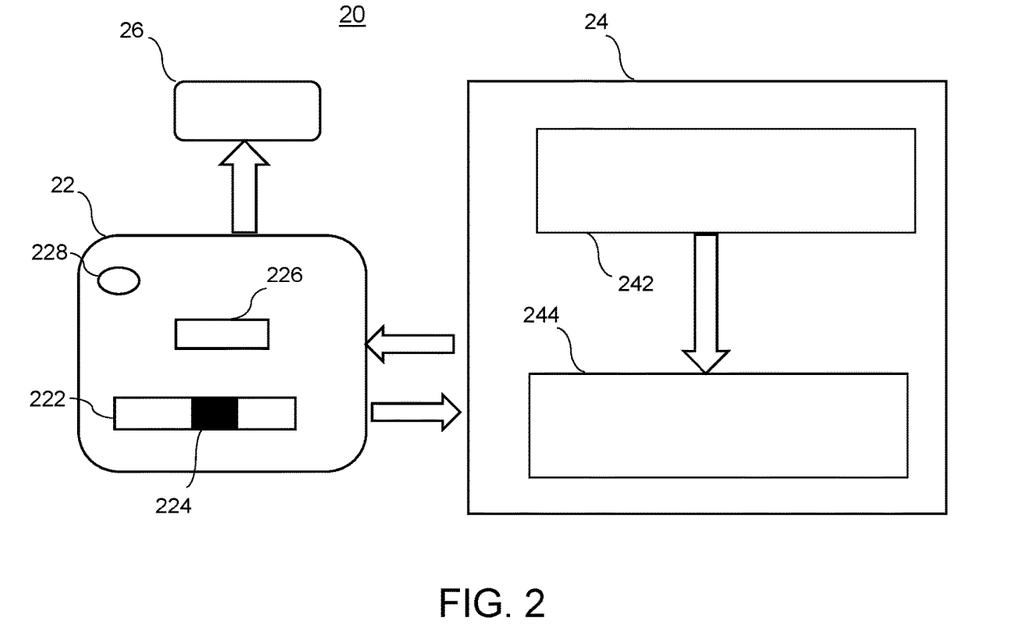
FIG. 2 illustrates a block diagram of components of an annotation assistant for efficient semi-automatic annotation of data with semantic attribute paths.

FIG. 2 illustrates components of a text annotation assistant 20 for efficiently creating annotated machine learning training data. Existing text annotation tools such as Brat or Prodigy are unable to manage a very large number of labels, as is precisely the case for semantic path labelling, because the number of distinct semantic paths is much larger than standard label sets for named entity recognition.

Annotation assistant 20 includes a graphical annotation interface provider 22, which provides a graphical annotation interface to a user (e.g., an annotator), for instance by providing the graphical annotation interface for display on a display of a user device, allowing the user to interact with the graphical annotation interface using one or more devices, and receiving user input from the interaction. The example graphical annotation interface displays an input sentence in a text window 222 as a sequence of tokens to be annotated. The annotator may employ the provided graphical annotation interface to select a span 224 comprising one or more tokens from the text. Example selection devices for interacting with the graphical annotation interface to select the span 224 include, but are not limited to, pointing devices (e.g., a mouse, stylus, pointer), touch screen, tracking devices (finger, eye, head, hand, etc.), a microphone and speech-to-text processing, etc.

Upon selection of a span, the span selection and the sequence of tokens are sent to an automatic span tagger 24, which includes an artificial neural network 242 and an optimal path algorithm 244. Automatic span tagger 24 may extract token vectors from the sentence employing the embedding of pre-trained tokens. Artificial neural network 242 employs the sequence of tokens and pre-trained token vectors to assign class probabilities to each token. The class probabilities score the probability that a token falls under a respective class from the predefined ontology. In example embodiments, the artificial neural network is a multi-label multi-class classification neural network. A nonlimiting example artificial neural network that may be used is disclosed in Ricardo Cerri, Rodrigo C. Barros, and André C. P. L. F. De Carvalho, Hierarchical multi-label classification using local neural networks, J. Comput. Syst. Sci., 80(1): 39-56, February 2014, which is incorporated in its entirety by reference herein. The artificial neural network is configured to classify tokens in a plurality of classes corresponding to semantic attribute paths, and may assign multiple possible semantic attribute paths to each token.

Span selection 224 is sent to optimal path algorithm 244 which also receives the class probabilities of the tokens from multi-label classifier 242. Optimal path algorithm 244 computes potential semantic attribute paths for the span, along with scores for each potential semantic attribute path. Optimal path algorithm 244 takes into account the combination of class probabilities of the tokens in the span to infer the most likely semantic attribute paths as the most likely paths over the classes of the ontology, given the class probabilities. More formally, given a span $s=t_i \ldots t_j$ selected from a tokenized text $t_1 t_2 \ldots t_n$, and the sequence $v_1 v_2 \ldots v_n$ of class probability vectors produced by the class-based model, an example path scoring algorithm operates as follows: (1) the average class probability for the span s is computed, (2) for every path $p=c_1 c_2 \ldots c_m$, a score is computed as the difference between the sum of the average probability vector for c in p and the sum of the average probability vector for c not in p, (3) the algorithm returns the list of scored path in descending order. Optimal path algorithm 244 can be implemented with well-known path search and scoring algorithms, such as but not limited to those disclosed in Jingchao Chen, Dijkstra's Shortest Path Algorithm 2003, University of Bialystok, ISSN 1426-263, which is incorporated herein by reference.

Optimal path algorithm 244 may also take the class probabilities of tokens surrounding the span into account. Taking into account the class probabilities of tokens surrounding the span may comprise selecting a number n of tokens before and after the span to be taken into account. Mean vectors of probabilities for the tokens may be calculated to yield mean vectors for the tokens within the span and mean vectors for the surrounding tokens. Further, a contextualized vector for the span may be computed from the mean vectors for the tokens within the span and a weighted sum of the mean vectors of the surrounding tokens with a distance-based weight decay to ensure that the closest tokens have higher contributions. The contextualized vector for the span may be supplied to optimal path algorithm 244 to compute scored semantic attributed paths taking into account class probabilities of tokens surrounding the span.

Optimal path algorithm 244 returns a set, e.g., an ordered list, of semantic attribute paths and respective scores, which are provided to the graphical annotation interface using the graphical annotation interface provider 22. The graphical annotation interface displays the ordered list of semantic attribute paths ordered by respective scores as graphical element 226. Graphical element 226 allows a user to select one of the semantic attribute paths by interacting with the graphical annotation interface using a suitable device, such as the example selection devices listed above. The device used to select the semantic attribute path may be the same device as that used to select the span or may be a different device. Graphical element 226 may display a top-ranked semantic attribute path as a default semantic attribute path that is selected without user intervention, i.e., when the user passes the step of selecting one of the semantic attribute paths. Graphical element 226 may display alternative semantic attribute paths ranked lower than the top-ranked semantic attribute path in a list, such as a scroll-down list that displays a number of highest ranked semantic attribute path and has a scroll bar that can be activated to move the displayed semantic attribute path towards lower ranked semantic attribute paths. In other embodiments, graphical element 226 may comprise a drop-down menu that can be accessed by selecting an icon adjacent to the displayed top-ranked semantic attribute path.

Figure 3:
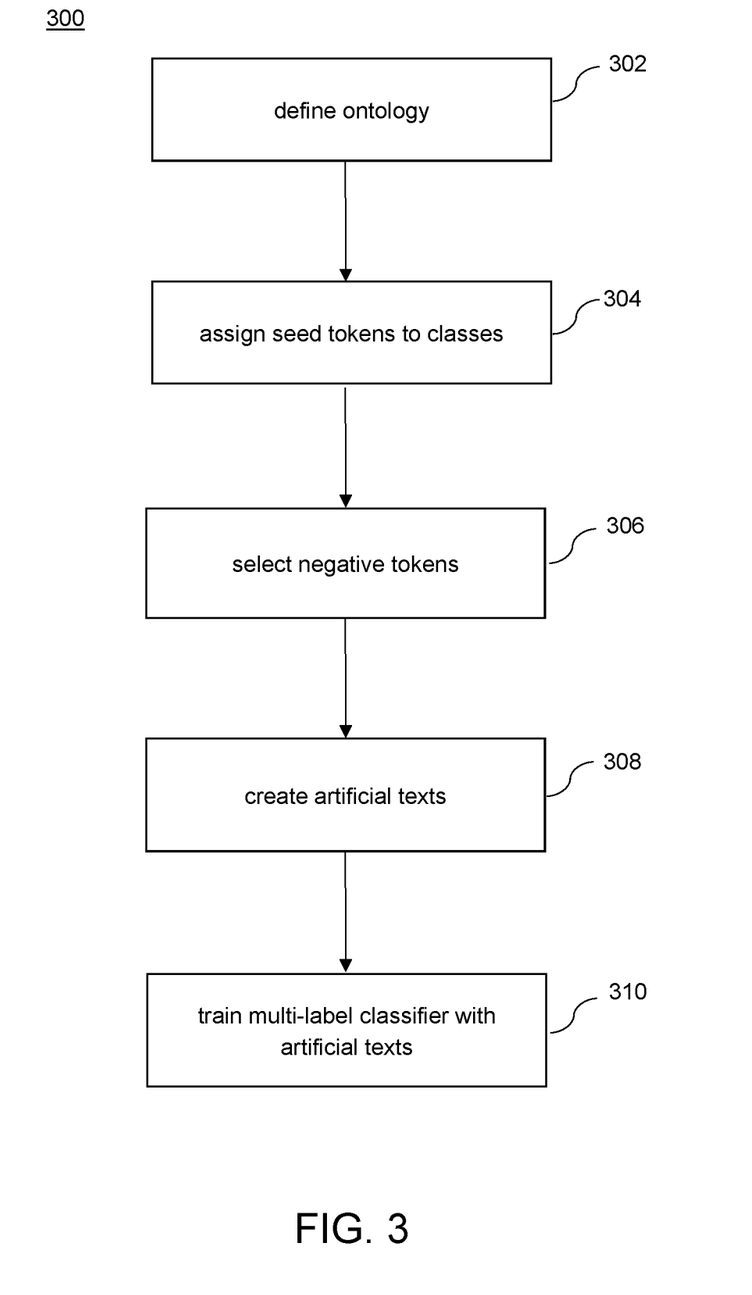
FIG. 3 illustrates a flow diagram of a method for pre-training an automatic span tagger.

To initially train automatic span tagger 24, method 300, illustrated in FIG. 3, may be employed. Method 300 corresponds to bootstrapping the model in a lightly supervised way by employing seed tokens for each class of the ontology. The seed tokens are used to construct a training set of synthetic sentences for the multi-label classifier that scores all possible classes locally.

Method 300 employs a predefined annotation scheme relying on a predefined ontology, and a vocabulary of pre-trained token vectors, e.g., word vectors. In step 302, the ontology is defined which defines the semantic attribute paths of the annotation scheme. In some example methods, this defining step 302 may take place prior to performing the method, and the predefined ontology may be provided, e.g., retrieved from memory or storage.

In step 304, each individual class, such as the classes Sport, Training, Time, Season in the example discussed above, is assigned a number of seed tokens, corresponding to tokens that should be classified as falling under the class. In some example embodiments, an average of five seed tokens per class is employed, though this number may be larger or smaller. As an example, the "Training" class can have the seed tokens "Coaching", "Training" and "Lessons".

In step 306 a similarity of all the seed tokens with the tokens in the vocabulary is computed. A set comprising a number k of tokens least similar to the set of seed tokens according to the computed similarity is chosen as a set of negative tokens. In example embodiments, the similarity of tokens in the vocabulary with the set of seeds for all the classes is measured by a cosine similarity. The number k is a hyperparameter of the disclosed approach.

Method 300 further comprises creating 308 artificial texts, e.g., artificial sentences, by combining, i.e. randomly concatenating, the seed tokens with tokens sampled from the list of negative tokens.

In step 310, the multi-label classifier 242 of the automatic span tagger 24 is trained with the artificial sentences as training data. Training 310 multi-label classifier 242 includes, for instance, supervised training whereby for seed tokens in the artificial sentences the respective class for which the token has been selected as a seed token forms an annotation.

Method 300 may also include adjusting the number k of least similar tokens. The number k may be adjusted empirically by manually inspecting the negative tokens that have highest similarity scores with the seed tokens. If the negative tokens that have highest similarity scores with the seed tokens include tokens that should not be counted as negative tokens, the number k can be decreased.

Figure 4:
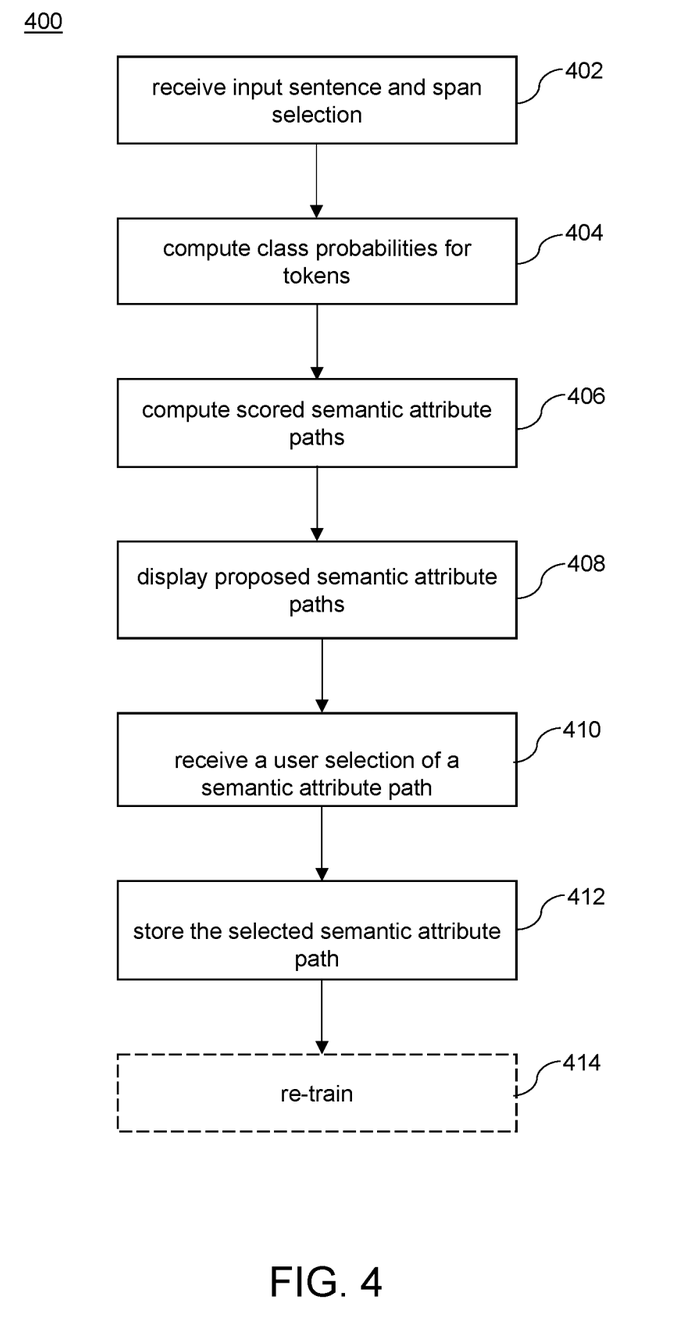
FIG. 4 illustrates a flow diagram of a method for efficient semi-automatic annotation of data with semantic attribute paths.

FIG. 4 illustrates a method 400 for annotation of text employing an annotation assistant. Method 400 comprises receiving 402 an input sentence and a span selection comprising tokens from the input sentence. For instance, in some example methods the input sentence can be retrieved from a database or other storage. Alternative or additionally, the input sentence can be provided simply by loading textual files through the interface. In embodiments, a user selects a span using a selection device, e.g., a pointing device, such as a mouse, to interact with the graphical annotation interface provided by graphical annotation interface provider 22. In response to receiving the selection, for instance as soon as or when the pointing device is actuated, the sentence and the selected span are sent to automatic span tagger 24.

Method 400 comprises computing 404 class probabilities for the tokens in the input sentence. In embodiments, computing the class probabilities is performed by multi-label classifier 242.

Method 400 further comprises computing 406 scored semantic attribute paths for the selected span from combining the class probabilities for tokens generated in step 404. The class probabilities yielded from step 404 correspond to a local prediction within the predefined ontology, which are combined in step 406 to score semantic attribute paths. In embodiments, class probabilities of tokens surrounding the tokens of the span selection may be taken into account, as described above.

The scored semantic attribute paths obtained as the result of step 406 may be displayed to the user in step 408. In embodiments, the semantic attribute paths are displayed as a set, e.g., a list, of semantic attribute paths, which may be ordered by the score of the respective semantic attribute paths. In embodiments, the list is displayed as a scroll-down menu of graphical annotation interface 22 allowing the user to scroll down to lower-ranked semantic attribute paths. A drop-down tool or other interface tool may be used.

Method 400 may further comprise receiving 410 a user selection from among the scored semantic attribute paths. In embodiments, the graphical annotation interface displays the semantic attribute path with the highest score as a default choice of a semantic attribute path for the currently selected span. If the user deems the displayed semantic attribute path correct, the user may proceed to select the next span, thereby implicitly sending the automatic span tagger the message that the proposed semantic attribute path is correct.

Alternatively, receiving 410 the user selection from among the scored semantic attribute paths comprises receiving a user selection of an alternative semantic attribute path. If the user deems the proposed semantic attribute path with highest score not correct, the user can select another semantic attribute path from the list of displayed semantic attribute paths. For example, the user may select an alternative semantic attribute path from a list of semantic attribute paths displayed in graphical annotation interface, or scroll down the list and select one of the semantic attribute paths ranked lower.

The system 20 then saves the sentence, the span, and the selected semantic attribute path in storage 26. These are added to previously obtained training data.

Method 400 may further comprise reconstructing an unlabeled graph reflecting the relations between the annotated spans of a sentence to allow further processing of the training data in machine learning tools for natural language processing.

The graphical annotation interface provided by graphical annotation interface provider 22 may have a train button 228. In response to a user clicking on train button 228, multi-label classifier 242 is re-trained 414, e.g., using all training data stored in storage 26 generated by the method 400 so far. Thereby, automatic span tagger 24 is provided with additional training data that train multi-label classifier 242 for improved prediction accuracy. As a result, the scores predicted by automatic span tagger 24 can improve, so that more and more frequently the correct semantic attribute path is weighted highest and is displayed as the proposed semantic attribute path. This allows for a further increase in the efficiency of the annotation process, because the user interaction beyond span selection is only required if the proposed semantic attribute path is not appropriate.

Methods 300 and 400 may be applied to generate labeled data for use in providing search for points of interest (POIs).

In other embodiments, example systems and methods may be advantageously employed for providing information relating to a POI to users, such providing of information being described, for example, in U.S. patent application Ser. No. 16/790,048, filed Feb. 13, 2020, entitled "Method and System for Providing Information to a User Relating to a Point-of-Interest," the entirety of which is disclosed herein by reference. Hence, for example, methods 300 and 400 may be applied to generate labeled data for use in a POI search system that automatically selects pieces of useful POI information from users' reviews, groups them into semantic categories, and makes them directly accessible to users when they search for and select POIs.

Methods 300 and 400 may also be applied in fine-grained information extraction systems for other applications. Non-limiting examples include event detection, database/knowledge base completion, social media analytics, biomedical or scientific relationship extraction.

Figure 5A:
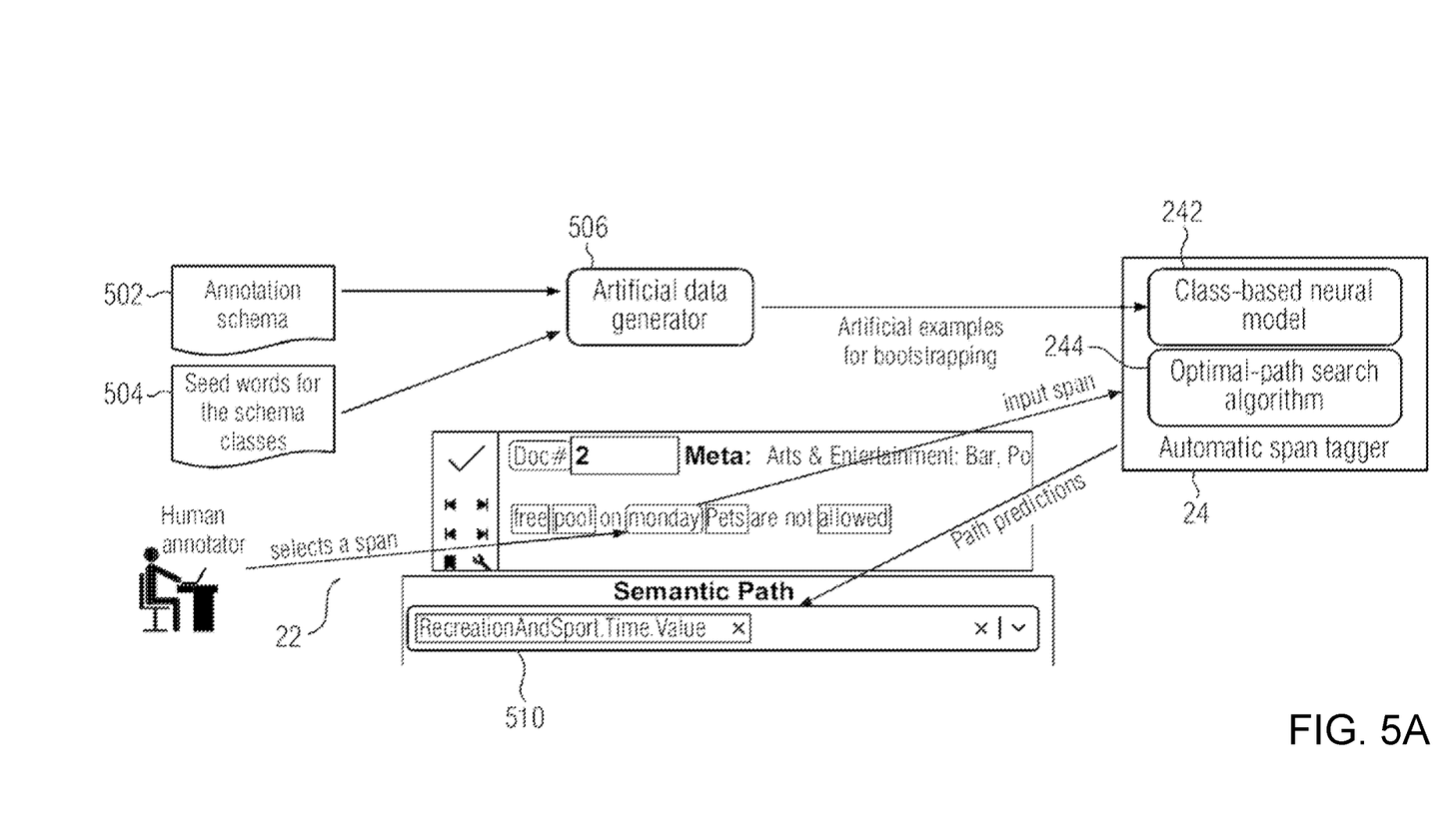
FIG. 5A illustrates user interaction with a graphical annotation interface to select a span from a sentence.
Figure 5B:
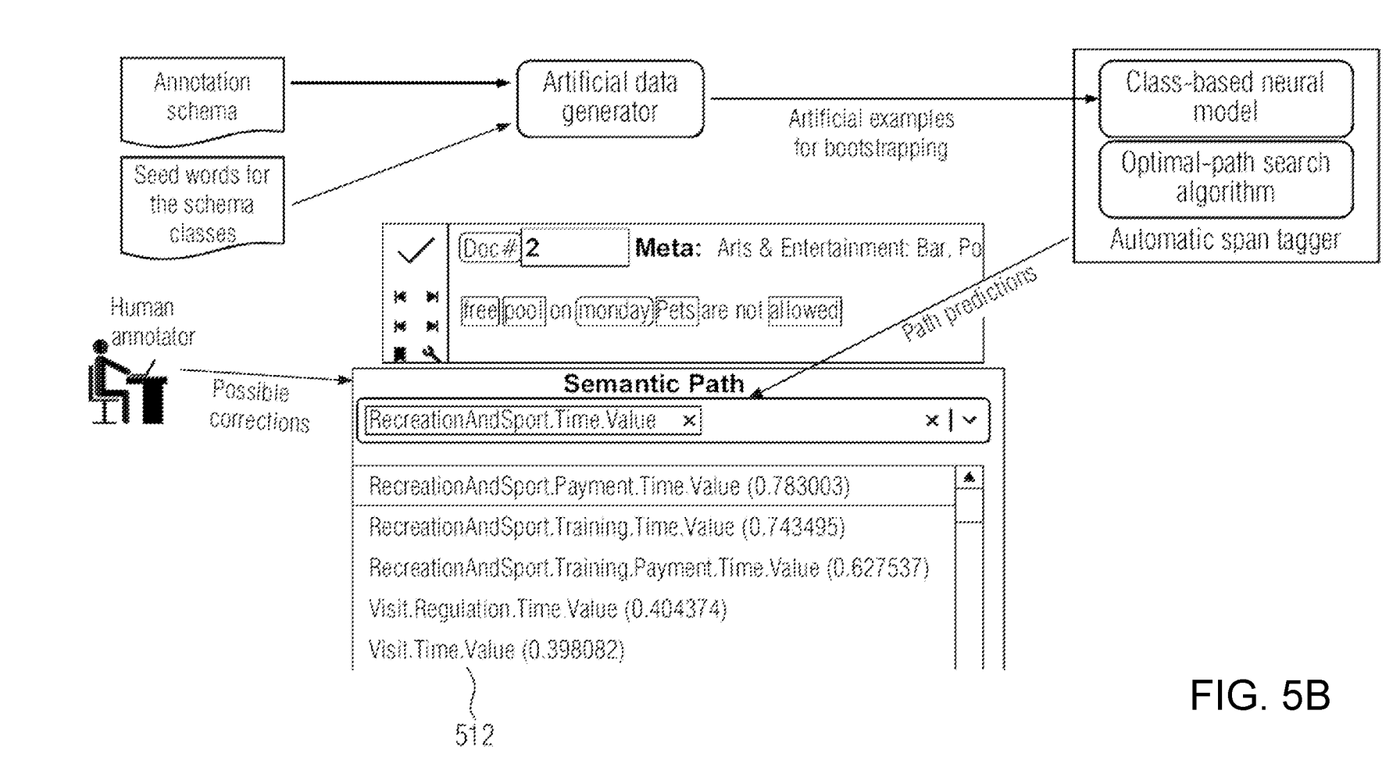
FIG. 5B illustrates user interaction with a graphical annotation interface to select a semantic attribute path for a span.

FIGS. 5A and 5B illustrate interaction of an annotator with a graphical annotation interface provided by graphical annotation interface provider 22. FIGS. 5A and 5B also illustrate interaction of the graphical annotation interface 22 with the automatic span tagger 24 and components for training the automatic span tagger 24.

In example methods, after having defined annotation schema 502, and having determined seed tokens 504 for the classes of the schema as described above in the method 300, artificial data generator 506 is employed to create artificial examples for initial training of the automatic span tagger 24. Artificial data generator 506 may create artificial sentences by combining tokens from the seed tokens 504 with tokens sampled from respective negative tokens.

After initial training has been completed, an annotator can employ the automatic span tagger to generate annotated data, e.g., by interacting with the graphical annotation interface. For example, the annotator may select a span from a displayed sentence, for example from a sentence displayed by the graphical annotation interface 22. The sentence may be provided (e.g., retrieved, loaded from files, etc.) and displayed, for instance, in response to a request provided via the graphical annotation interface, or may automatically be provided and displayed. In response to a selection, e.g., as soon as or when the annotator actuates a selection device such as a pointing device employed to select a span, the span is sent to automatic span tagger 24, which returns scored predictions for semantic attribute paths.

In the example displayed in FIG. 5A, the annotator selects the span "Monday", and the automatic span tagger 24 returns the semantic attribute path Recreation&Sport.Time.Value, which is displayed as a top-ranked semantic attribute path 510 in graphical annotation interface (provided by the graphical annotation interface provider) 22. In experiments such as those described in the following section, about 42% of the proposed semantic attribute paths were correct even in the initial annotation phase, when the system has only been bootstrapped as explained above with reference to FIG. 3 and not yet trained with real sentences.

FIG. 5B illustrates an annotator correcting the proposed semantic attribute path. Graphical annotation interface provided by the graphical annotation interface provider 22 displays a set of semantic attribute paths in the form of a menu 512, which may be a dropdown menu 512 as displayed in FIG. 5B, with alternative semantic attribute paths ranked by respective scores. The annotator can select one of the alternative semantic attribute paths from the menu and thereby correct the proposed semantic attribute path. In experiments such as those described in the following section, in most cases in which the proposed semantic attribute path is not the correct one, the correct one was among the first four alternative semantic attribute paths.

Figure 7:
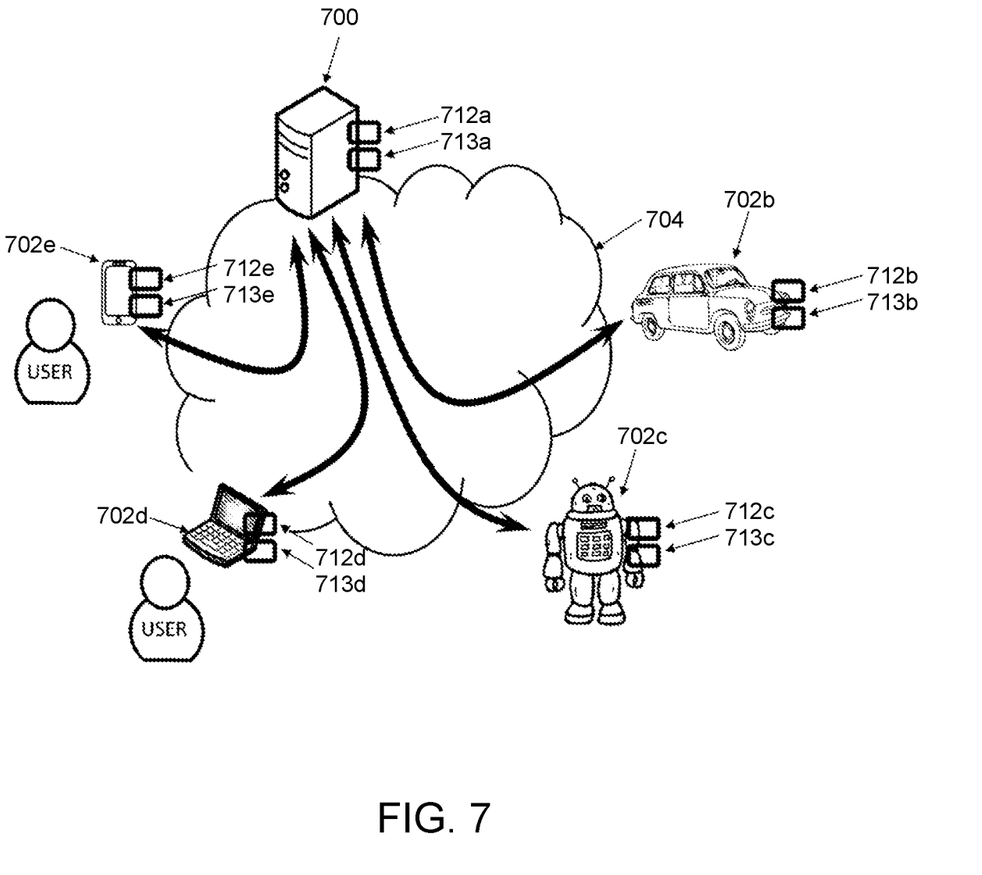
FIG. 7 illustrates an example computing environment in which the disclosed methods may be performed.

The above-mentioned systems, methods and embodiments may be implemented within an architecture such as that illustrated in FIG. 7, which comprises server 700 and one or more client devices 702 that communicate over a network 704 which may be wireless and/or wired, such as the Internet, for data exchange. Server 700 and the client devices 702 each include processor 712 and memory 713, such as but not limited to random-access memory (RAM), hard disks, solid state disks, or other non-volatile storage media. Memory 713 may also be provided in whole or in part by external storage in communication with the processor 712. It will be appreciated that the processor 712 can include either a single processor or multiple processors operating in series or in parallel, and that the memory 713 can include one or more memories, including combinations of memory types and/or locations. Server 700 may also include, but are not limited to, dedicated servers, cloud-based servers, or a combination.

Client devices 702 may be any processor-based device, terminal, etc., and/or may be embodied in a client application executable by a processor-based device, etc. Client devices may be disposed within the server 700 and/or external to the server (local or remote, or any combination) and in communication with the server. Example client devices 702 include, but are not limited to, autonomous vehicle 702b, robot 702b, computer 702d, or cell phone 702e, or devices not shown in FIG. 7 such as virtual reality (VR), augmented reality (AR), or mixed reality (MR) devices. Client devices 702 may be configured for sending data to and/or receiving data from the server 700, and may include, but need not include, one or more output devices, such as but not limited to displays, printers, etc. for displaying or printing results of certain methods that are provided for display by the server. Client devices may include combinations of client devices.

More precisely, in an embodiment, the system according to the embodiments of FIGS. 1 and 2 may be implemented by server 700. Server 700 may provide automatic span tagger 24 and storage 26 may be included in storage 712a. Server 700 may also provide graphical annotation interface provider 22, which provides a graphical annotation interface for display on a display of the client device 702, and the provided graphical annotation interface may interact with automatic span tagger 24 on server 700 to allow an annotator to provide annotations to storage 712a as described above with reference to FIGS. 4, 5A, and 5B. Alternatively, client device 702 may provide graphical annotation interface 22, which may interact with automatic span tagger 24 on server 700 to allow an annotator to provide annotations to storage 712a as described above with reference to FIGS. 4, 5A, and 5B. In other embodiments, client device 702 may provide an interface or a portion thereof, and the server 700 may provide the graphical annotation interface by interfacing with, manipulating, and/or supplementing the client interface or portion. Server 700 may, upon receiving a re-train command from client device 702, re-train automatic span tagger 24 employing the annotations stored in storage 712a.

The embodiments described above may be implemented in hardware or in software. The implementation can be performed using a non-transitory storage medium such as a computer-readable storage medium, for example a floppy disc, a DVD, a Blu-Ray, a CD, a ROM, a PROM, an EPROM, an EEPROM or a FLASH memory. Such computer-readable media can be any available media that can be accessed by a general-purpose or special-purpose computer system.

Generally, embodiments can be implemented as computer program products with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor.

EXPERIMENTS AND RESULTS

The described method and system were implemented employing user free-text comments from the recommendation provider Foursquare, containing useful information from user reviews or comments about Points of Interest (POIs). User comments on POIs can be very relevant e.g., for travelers, as they cover various aspects outside the scope of travel guides. The huge number of free-text comments, if they could be processed, could effectively complement POI databases.

The employed user comments from Foursquare range over a wide range of POI types, and thus the annotation scheme covers a large number of semantic classes, attributes and relations. For training, testing and development, 12000 Foursquare comments were employed, concentrating on the POI categories of Food, Arts& Entertainment and Outdoors & Recreation.

Figure 6:
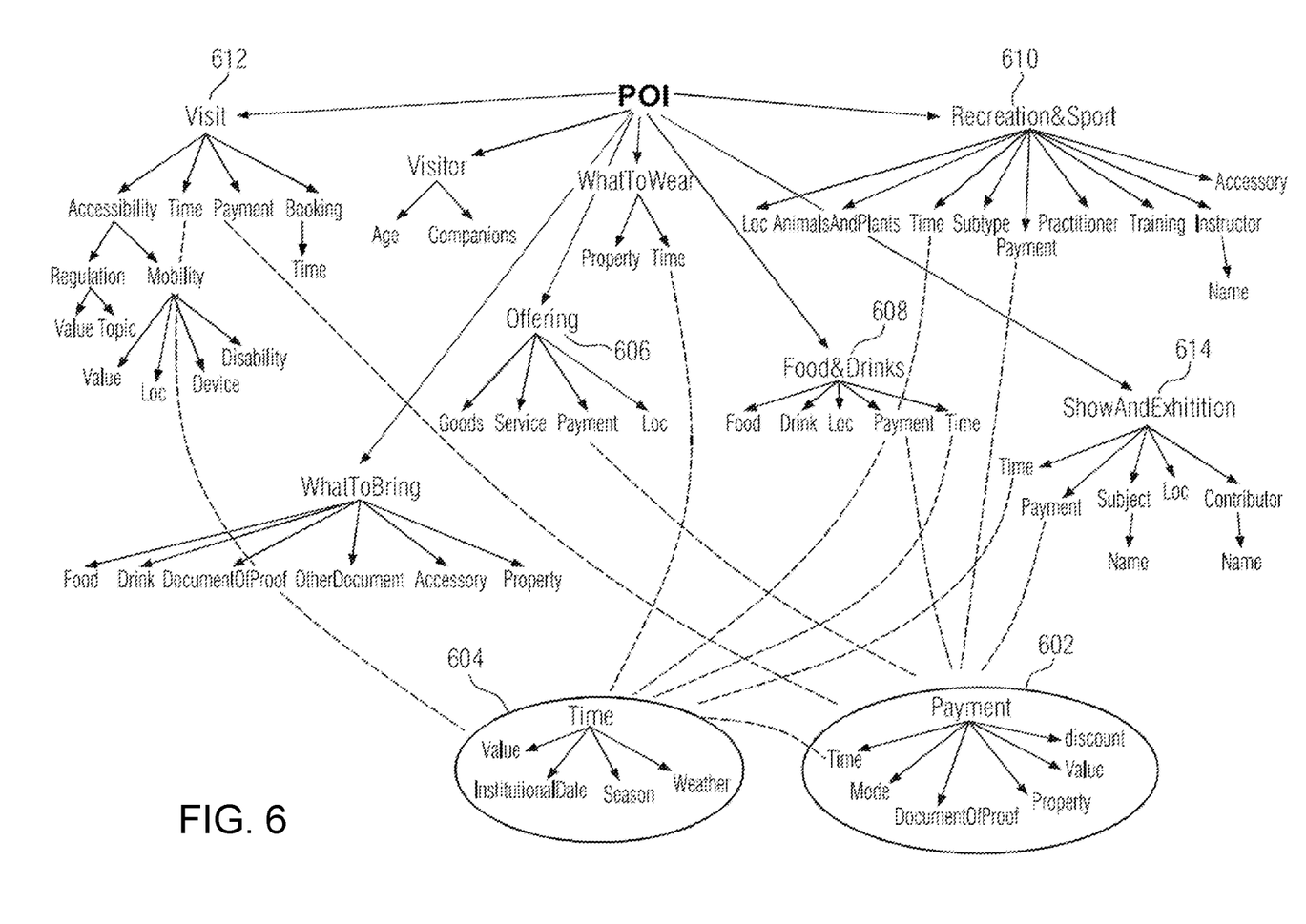
FIG. 6 shows an example ontology employed for fine-grain information extraction from user generated comments on places of interest.

The employed ontology contains 8 top classes of Visitor, Visit, WhatToWear, WhatToBring, ShowAndExhibition, Recreation&Sport, Food&Drinks, Offering, and 42 semantic classes, so that the annotation scheme contained 185 semantic attribute paths. FIG. 6 illustrates the ontology employed. As is evident, the ontology does not correspond to a tree graph, as nodes "Payment" 602 and "Time" 604 have multiple parents. Node "Payment" 602 has the parents "Offering" 606, "Food & Drinks" 608, "Recreation&Sport" 610, "Visit" 612, and "ShowAndExhibition" 614.

In experiments, the performance of the example method and system is the capacity of the system to assist annotators by proposing appropriate labels. To establish the usefulness of the example method, automatic tests of its performance were done. Performance of the method was measured by the ability of the system to rank the correct label among the displayed semantic attribute paths. The method is compared with an approach of randomly proposing semantic attribute paths and with an approach of proposing the most frequently used semantic attribute paths.

Table 1 describes the results of experiments conducted. The column "Prec. @1" reports the frequency with which the correct semantic attribute path is proposed as the top-ranked semantic attribute path, while the columns "Prec. @3", "Prec. @5", "Prec. @10", "Prec. @20" analogously report the frequency with which the annotation assistant lists the correct semantic attribute path among the top 3, top 5, top 10 and top 20 semantic attribute paths, respectively. The lines labeled with "Random" report results from the method of randomly proposing semantic attribute paths and the lines labeled with "Freq." report results of the method based on proposing semantic attribute paths based on frequency. These performance measures have been computed for increasing training data size (#Trained docs), corresponding to the number of annotated sentences, from 0 to 2000, to assess the effect of training size on the performance.

As can be inferred from the results of Table 1, the frequency based method already reaches a plateau of around 23% with a training size of 100, while the example method constantly and considerably increases precision with training size. With 2,000 annotated sentences, the example method reaches a precision of around 68%, so that for two-thirds of spans the correct semantic attribute path is proposed. In addition, the figure of 80% for the times when the right semantic attribute path is among the five highest ranked proposed semantic attribute paths, represents a very effective assistance to the user, because he or she does not have to scroll down in the displayed menu, as illustrated in FIG. 5B, but rather can select the appropriate semantic attribute path with a single gesture.

Example methods and systems herein can provide a relaxation of the task of relation and entity extraction allowing for a significant reduction in the burdens of the annotation task. Example methods and systems can further provide an annotation assistant providing a graphical annotation interface that supports annotators in rapidly annotating sentences with semantic attribute paths.

The foregoing description is merely illustrative in nature and is in no way intended to limit the disclosure, its application, or uses. The broad teachings of the disclosure may be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure may be implemented in and/or combined with features of any of the other embodiments, even if that combination is not explicitly described. In other words, the described embodiments are not mutually exclusive, and permutations of one or more embodiments with one another remain within the scope of this disclosure.

TABLE 1

| # Trained docs | Method | Prec. @1 | Prec. @3 | Prec. @5 | Prec. @10 | Prec. @20 |
| --- | --- | --- | --- | --- | --- | --- |
| 0 | Random | 0.0010 | 0.0117 | 0.0119 | 0.1030 | 0.1253 |
|  | Freq. | 0.0000 | 0.0002 | 0.0048 | 0.0152 | 0.0344 |
|  | Ours | 0.4242 | 0.5561 | 0.6029 | 0.6393 | 0.6748 |
| 100 | Random | 0.0010 | 0.0114 | 0.0116 | 0.1025 | 0.1246 |
|  | Freq. | 0.2342 | 0.3900 | 0.4877 | 0.6473 | 0.7569 |
|  | Ours | 0.5178 | 0.6328 | 0.6637 | 0.7110 | 0.7534 |
| 300 | Random | 0.0011 | 0.0118 | 0.0119 | 0.1018 | 0.1241 |
|  | Freq. | 0.2313 | 0.3859 | 0.4976 | 0.6428 | 0.7722 |
|  | Ours | 0.5461 | 0.6799 | 0.7182 | 0.7649 | 0.8040 |
| 500 | Random | 0012 | 0.0119 | 0.0121 | 0.1020 | 0.1255 |
|  | Freq. | 0.2329 | 0.3868 | 0.4971 | 0.6407 | 0.7821 |
|  | Ours | 0.5911 | 0.6993 | 0.7367 | 0.7829 | 0.8148 |
| 1000 | Random | 0.0012 | 0.0121 | 0.0123 | 0.1029 | 0.1256 |
|  | Freq. | 0.2332 | 0.3872 | 0.4969 | 0.6393 | 0.7826 |
|  | Ours | 0.6379 | 0.7455 | 0.7781 | 0.8165 | 0.8465 |
| 2000 | Random | 0.0005 | 0.0134 | 0.0134 | 0.1049 | 0.1313 |
|  | Freq. | 0.2357 | 0.3872 | 0.5007 | 0.6402 | 0.7925 |
|  | Ours | 0.6828 | 0.7791 | 0.8016 | 0.8395 | 0.8711 |

Each module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module. Each module may be implemented using code. The term code, as used above, may include software, firmware, and/or microcode, and may refer to programs, routines, functions, classes, data structures, and/or objects.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The systems and methods described in this application may be partially or fully implemented by a special purpose computer created by configuring a general purpose computer to execute one or more particular functions embodied in computer programs. The functional blocks, flowchart components, and other elements described above serve as software specifications, which may be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

The invention claimed is:

1. An interactive annotation method for assisting a user in creation of annotated machine learning training data, the annotation method comprising:
providing, using a processor, a sequence of tokens to be annotated for display to a user in a graphical annotation interface, wherein the tokens comprise text;
receiving a span selection from the user via the graphical annotation interface, the span selection comprising one or more tokens from the sequence of tokens, wherein the user interacts with the graphical annotation interface using one or more selection devices;
in response to said received span selection, computing, by an artificial neural network using the processor, class probabilities for each token of the sequence of tokens, the class probabilities for a token corresponding to probabilities for the token to fall under respective classes of a predefined ontology;
computing, using the processor, scores for semantic attribute paths of the span selection, the scores for the semantic attribute paths being based on the class probabilities, wherein the semantic attribute paths correspond to paths in the predefined ontology;
providing a set of semantic attribute paths for the span selection for display to the user via the graphical annotation interface as an interactive graphical element;
receiving a user selection of a semantic attribute path from the set of displayed semantic attribute paths via the graphical annotation interface, wherein the user interacts with the graphical annotation interface using one or more selection devices; and
in response to said received user selection of a semantic attribute path, storing the sequence of tokens and the selected semantic attribute path for the span selection in the annotated machine learning training data.

2. The annotation method of claim 1, wherein the displayed set of semantic attribute paths in the interactive graphical element ranks the semantic attribute paths by their respective score.

3. The annotation method of claim 1, wherein computing the scores for semantic attribute paths of the span selection is based on the class probabilities for the tokens of the span selection and on the class probabilities of tokens surrounding the tokens of the span selection.

4. The annotation method of claim 1, further comprising re-training the artificial neural network employing the stored machine learning training data.

5. The annotation method of claim 1, wherein the displayed set of semantic attribute paths in the interactive graphical element comprises a scroll-down list or a drop-down menu of semantic attribute paths.

6. The annotation method of claim 5, wherein receiving the user selection of a semantic attribute path comprises receiving a user input indicating acceptance of a semantic attribute path ranked highest in the list of displayed semantic attribute paths or receiving a selection of an alternative semantic attribute path from the list of semantic attribute paths.

7. The annotation method of claim 5, wherein the semantic attribute path ranked highest in the list of semantic attribute paths is displayed in the scroll-down list or drop-down menu as a default user selection.

8. The annotation method of claim 5, wherein receiving the user input indicating acceptance of the semantic attribute path ranked highest comprises receiving another span selection via the graphical annotation interface.

9. The annotation method of claim 1, wherein the text is taken from a user generated comment.

10. The annotation method of claim 9, wherein the user generated comment relates to a point of interest (POI).

11. The annotation method of claim 9, wherein the user generated comment relates to a retailer.

12. The method of claim 1, further comprising:
pre-training the artificial neural network for information extraction, said pre-training comprising:

assigning seed tokens for each class of a predefined ontology;
computing, using a processor, a similarity of all seed tokens assigned to the classes with vocabulary tokens in a vocabulary of pre-trained token vectors, and selecting a number of least similar vocabulary tokens as negative tokens;
creating, using the processor, artificial texts by combining the seed tokens with tokens sampled from the list of negative tokens; and
using the processor, employing the classes of the seed tokens as annotations of the artificial texts for training an initial artificial neural network to provide the pre-trained artificial neural network.

13. The method of claim 12, further comprising optimizing, using the processor, the number of least similar vocabulary tokens.

14. The method of claim 12, wherein the predefined ontology contains a first number of top classes and a second number of semantic classes.

15. An apparatus for assisting in creation of annotated machine learning training data, the apparatus comprising:
a processor; and
a memory;
wherein the processor is configured using code instructions stored in the memory to:
cause to be displayed to a user a sequence of tokens to be annotated via a graphical annotation interface, wherein the tokens comprise text, and wherein the graphical annotation interface is configured for receiving a span selection by the user;
assign class probabilities to each token of the sequence of tokens using an artificial neural network of an automatic span tagger, the class probabilities for a token corresponding to probabilities for the token to fall under respective classes of the predefined ontology;
compute scores for semantic attribute paths of the span selection using a path-scoring algorithm of the automatic span tagger, the scores for the semantic attribute paths being based on the class probabilities, wherein the semantic attribute paths correspond to paths in a predefined ontology;
cause the scored semantic attribute paths to be displayed to the user via the graphical annotation interface;
receive the selection among the scored semantic attribute paths from the user via the graphical annotation interface; and
store in the memory the sequence of tokens and the selected semantic attribute path for the span selection as annotated machine learning data.

16. The apparatus of claim 15, wherein the graphical annotation interface comprises a train button to initiate re-training of the artificial neural network employing the stored machine learning training data.

17. The apparatus of claim 16, wherein the path-scoring algorithm is configured to compute the scored semantic attribute paths for the span selection based on the class probabilities by employing the class probabilities of the tokens in the span selection and the class probabilities of tokens surrounding the tokens of the span selection as optimal paths in the predefined ontology.

18. The apparatus of claim 16, wherein the artificial neural network is a multi-label multi-class classification neural network trained for classifying spans of texts into the classes.

19. The apparatus of claim 15, further comprising:
a display for displaying the sequence of tokens to be annotated and the scored semantic attribute paths to the user; and
one or more selection devices for enabling the user to select the span selection and the selection among the scored semantic attribute paths.

20. A non-transitory computer-readable medium storing an interactive annotation program including instructions that, when executed by a processor, causes a graphical annotation interface and memory forming part of an apparatus for assisting a user in creation of annotated machine learning training data, to:
cause to be displayed to the user a sequence of tokens to be annotated via the graphical annotation interface, wherein the tokens comprise text, and wherein the graphical annotation interface is configured for receiving a span selection by the user;
assign class probabilities to each token of the sequence of tokens using an artificial neural network of an automatic span tagger, the class probabilities for a token corresponding to probabilities for the token to fall under respective classes of a predefined ontology;
compute scores for semantic attribute paths of the span selection using a path-scoring algorithm of the automatic span tagger, the scores for the semantic attribute paths being based on the class probabilities, wherein the semantic attribute paths correspond to paths in the predefined ontology;
cause the scored semantic attribute paths to be displayed to the user via the graphical annotation interface;
receive the selection among the scored semantic attribute paths from the user via the graphical annotation interface; and
store in the memory the sequence of tokens and the selected semantic attribute path for the span selection as annotated machine learning data.

* * * * *